United States Patent
Furukawa et al.

(10) Patent No.: US 10,720,873 B2
(45) Date of Patent: Jul. 21, 2020

(54) ELECTRIC DRIVE DEVICE AND CONTROL METHOD FOR SAME

(71) Applicant: Mitsubishi Electric Corporation, Tokyo (JP)

(72) Inventors: Akira Furukawa, Tokyo (JP); Yu Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 345 days.

(21) Appl. No.: 15/548,480

(22) PCT Filed: Feb. 23, 2015

(86) PCT No.: PCT/JP2015/054942
§ 371 (c)(1),
(2) Date: Aug. 3, 2017

(87) PCT Pub. No.: WO2016/135805
PCT Pub. Date: Sep. 1, 2016

(65) Prior Publication Data
US 2018/0006594 A1    Jan. 4, 2018

(51) Int. Cl.
*H02P 29/64* (2016.01)
*H02P 27/06* (2006.01)
(Continued)

(52) U.S. Cl.
CPC ............ *H02P 29/64* (2016.02); *B62D 5/0403* (2013.01); *H02K 1/272* (2013.01); *H02K 9/00* (2013.01);
(Continued)

(58) Field of Classification Search
CPC .......... H02K 1/272; H02K 9/00; H02K 11/21; H02P 25/16; H02P 27/06; H02P 29/032; H02P 29/64; B62D 5/0403
(Continued)

(56) References Cited

U.S. PATENT DOCUMENTS

2005/0093489 A1  5/2005  Furumi et al.
2007/0176577 A1* 8/2007  Kezobo ................. B62D 5/046
                                                           318/807
(Continued)

FOREIGN PATENT DOCUMENTS

EP   2637285 A1   9/2013
JP   3953932 B2   8/2007
(Continued)

OTHER PUBLICATIONS

International Search Report for PCT/JP2015/054942 dated May 19, 2015.
(Continued)

*Primary Examiner* — Alfonso Perez Borroto
*Assistant Examiner* — Rashad H Johnson
(74) *Attorney, Agent, or Firm* — Sughrue Mion, PLLC; Richard C. Turner

(57) ABSTRACT

Provided is an electric drive device which controls a current supplied to coils during normal operation so as to be less than a current limit value when normal, which is determined from heat generating properties and heat radiating properties of a thermally coupled body that includes the coils and an inverter circuit. When an abnormality in each group or each phase of the coils and the inverter circuit is detected, the supply of current to all phases of a group suffering an abnormality in the coils, or to a phase that is not capable of continuous operation, is stopped or reduced; and the limit value of the current supplied to a coil that is capable of continuous operation is reset to a current limit value in the event of abnormality, which is larger than the current limit value when normal, within the range of improvement of the heat generating properties of the thermally coupled body due to the stopping or reduction of the supply of current.

9 Claims, 6 Drawing Sheets

(51) Int. Cl.
*H02P 25/16* (2006.01)
*H02P 29/032* (2016.01)
*H02K 11/21* (2016.01)
*B62D 5/04* (2006.01)
*H02K 1/27* (2006.01)
*H02K 9/00* (2006.01)

(52) U.S. Cl.
CPC .............. *H02K 11/21* (2016.01); *H02P 25/16* (2013.01); *H02P 27/06* (2013.01); *H02P 29/032* (2016.02)

(58) Field of Classification Search
USPC .......................... 310/53, 68 C, 68 D, 71, 361
See application file for complete search history.

(56) References Cited

U.S. PATENT DOCUMENTS

| | | | | |
|---|---|---|---|---|
| 2009/0267441 | A1* | 10/2009 | Hiramatsu | H02K 3/28 310/208 |
| 2010/0194230 | A1* | 8/2010 | Naganawa | H02K 15/066 310/208 |
| 2011/0101904 | A1 | 5/2011 | Sakamoto | |
| 2011/0156627 | A1* | 6/2011 | Nakamura | B62D 5/0403 318/400.22 |
| 2013/0141871 | A1* | 6/2013 | Omae | B62D 5/0406 361/709 |
| 2013/0299271 | A1* | 11/2013 | Endo | B62D 5/046 180/446 |
| 2019/0077450 | A1* | 3/2019 | Sasaki | H02P 29/028 |
| 2019/0199268 | A1* | 6/2019 | Hatsuda | H02P 29/64 |
| 2019/0199269 | A1* | 6/2019 | Okuhata | H02P 29/64 |

FOREIGN PATENT DOCUMENTS

| | | |
|---|---|---|
| JP | 2011-098625 A | 5/2011 |
| JP | 4831503 B2 | 12/2011 |
| JP | 4998836 B2 | 8/2012 |
| JP | 2013-236486 A | 11/2013 |
| JP | 2014-027770 A | 2/2014 |
| JP | 2014-143841 A | 8/2014 |

OTHER PUBLICATIONS

Communication dated Dec. 29, 2018, from the State Intellectual Property Office of People's Republic of China in counterpart Application No. 201580076287.9.

Communication dated Oct. 19, 2018, from European Patent Office in counterpart application No. 15883105.7.

* cited by examiner

OUTPUT SIDE

ELECTRIC DRIVE DEVICE AND CONTROL METHOD FOR SAME

CROSS REFERENCE TO RELATED APPLICATIONS

This application is a National Stage of International Application No. PCT/JP2015/054942 filed Feb. 23, 2015, the contents of all of which are incorporated herein by reference in their entirety.

TECHNICAL FIELD

The present invention relates to an electric drive device having a plurality of groups of motor coils and inverter circuits, which can be driven independently, and to a control method for the electric drive device.

BACKGROUND ART

Among electric drive devices used in an electric power steering device, there are drive devices which have two groups of motor coils and inverter circuits, which can be driven independently. Consequently, even if there is an abnormality in the motor coil and inverter circuit of one group, driving of the motor can still be continued by the other normally functioning group.

Among conventional electric drive devices of this kind, there is a device wherein, if there is a shorting fault in a switching element of the inverter circuit in the control unit, severe effects on the braking torque due to the fault are suppressed by increasing the motor drive output in the normal group (see, for example, PTL 1).

Furthermore, in a further electric drive device, if the switching element suffers an open fault, then even a group where an abnormality has occurred operates continuously in the phases in which continuous operation is possible, and the output in the normal phases is increased by an amount corresponding to the decrease in torque in the phase where the abnormality has occurred (see, for example, PTL 2).

Moreover, in a further electric drive device, if one motor of a plurality of motors suffers a fault, the decrease in torque in the motor suffering an abnormality is compensated for by raising the current limit value of the normally functioning motor (see, for example, PTL 3).

CITATION LIST

Patent Literature

[PTL 1] Japanese Patent No. 4831503
[PTL 2] Japanese Patent No. 4998836
[PTL 3] Japanese Patent No. 3953932

SUMMARY OF INVENTION

Technical Problem

In PTL 1, during normal operation, the motor drive is set to 100% of the specification, and in the event of an abnormality, the motor drive is kept at 50% overall by driving the normal inverter circuits at 50% or above.

However, in PTL 1, the high potential-side switching elements and low potential-side switching elements of the normal group are simply controlled so as to cancel out variation in the output of the group where an abnormality has occurred, and therefore it is only possible to keep the torque output of the motor uniform in a range of 50% of the maximum torque output that may be required during normal operation. With current vehicles, when the motor is driven at 50% of the characteristics, steering is not considered to be sufficient, and in particular, in the case of large vehicles or slows speeds, when the reaction from the road surface is large, it is difficult for a driver who is not physically strong to turn the steering wheel.

Furthermore, in PTL 2, even in a group which has suffered an abnormality, if operation continues in the phase where continuous operation is possible, then it is possible to control the motor to 50% or above in combination with the normal side, but when only one phase of a three-phase current is stopped, then on the defective side, current ceases to be supplied during a period corresponding to ⅓ of the period of the stopped phase, and therefore the torque variation in the motor during one cycle of the electrical angle increases. Variation in the torque during steering creates a worse feeling for the driver, and therefore it is not possible to achieve a pleasant steering sensation, unless the uniform torque expected by the driver can be maintained.

Furthermore, in PTL 3, when there is spare margin in the limit value of the current supplied to each motor for normal operation, then even if there is an abnormality, it is still possible to improve the assist torque by raising the current limit value, but using motors which have a spare margin in the current limit value involves fitting motors of a larger than optimum size, which is inconvenient in terms of layout.

The present invention was devised in order to solve the problems described above, an object thereof being to achieve an electric drive device, and a control method for same, wherein, even if there is no spare margin in the limit value of the current to the motor coil during normal operation, when an abnormality in the motor is detected, the current to the motor coil where an abnormality has not occurred is increased in comparison with normal operation and it is therefore possible to suppress the effects of decline and variation in the motor torque due to the abnormality.

Solution to Problem

The electric drive device according to the present invention is an electric drive device, comprising: a multiple-phase rotary machine having a stator in which coils of m groups and n phases are wound, where m is a natural number equal to or greater than 1 and n is a natural number equal to or greater than 2, and a single rotor; an inverter circuit which supplies current independently to each group and each phase of the coils; and a control circuit including a drive circuit which drives the inverter circuit, the control circuit controlling a current supplied to the coils during normal operation so as to be less than a current limit value when normal, which is determined from heat generating properties and heat radiating properties of a thermally coupled body that includes the coils and the inverter circuit, wherein the control circuit further includes an abnormality detection circuit which detects an abnormality in each group or each phase of the coils and the inverter circuit, and when the abnormality detection circuit detects an abnormality, the control circuit: stops or reduces the supply of current to all phases of a group suffering an abnormality in the coils, or to a phase that is not capable of continuous operation; resets the limit value of the current supplied to a coil that is capable of continuous operation, to a current limit value in the event of abnormality, which is larger than the current limit value when normal, within the range of improvement of the heat generating properties of the thermally coupled body due to the stopping or reduction of the supply of current; and controls the current supplied to at least one group or phase of the coil that is capable of continuous operation so as to be less than the current limit value in the event of abnormality.

Furthermore, the control method for an electric drive device according to the present invention is a control method for an electric drive device that includes: a multiple-phase rotary machine having a stator in which coils of m groups and n phases are wound, where m is a natural number equal to or greater than 1 and n is a natural number equal to or greater than 2, and a single rotor; and an inverter circuit which supplies current independently to each group and each phase of the coils, the method including: an abnormality detection step of detecting an abnormality in each group or each phase of the coils and the inverter circuit; a step of, when an abnormality is not detected in the abnormality detection step, controlling a current supplied to the coils so as to be less than a current limit value when normal, which is determined from heat generating properties and heat radiating properties of a thermally coupled body that includes the coils and the inverter circuit; when an abnormality is detected in the abnormality detection step, a step of stopping or reducing the supply of current to all phases of a group suffering an abnormality in the coils, or to a phase that is not capable of continuous operation; a step of resetting the limit value of the current supplied to a coil that is capable of continuous operation, to a current limit value in the event of abnormality, which is larger than the current limit value when normal, within the range of improvement of the heat generating properties of the thermally coupled body due to the stopping or reduction of the supply of current; and a step of controlling the current supplied to at least one group or phase of the coil that is capable of continuous operation so as to be less than the current limit value in the event of abnormality.

Advantageous Effects of Invention

As described above, when an abnormality in the motor is detected, the current to a motor coil which is not capable of continuous operation is stopped, and furthermore, in view of the improvement in the heat generating properties of the motor caused by this stopping of the current, the limit value of the current to the motor coil of the phase that is capable of continuous operation is raised. As a result of this, it is possible to achieve an electric drive device, and a control method for same, wherein, even if there is no spare margin in the limit value of the current to the motor coil during normal operation, when an abnormality in the motor is detected, the current to the motor coil where an abnormality has not occurred is increased in comparison with normal operation and it is therefore possible to suppress the effects of decline and variation in the motor torque due to the abnormality.

DESCRIPTION OF EMBODIMENTS

Figure 1:
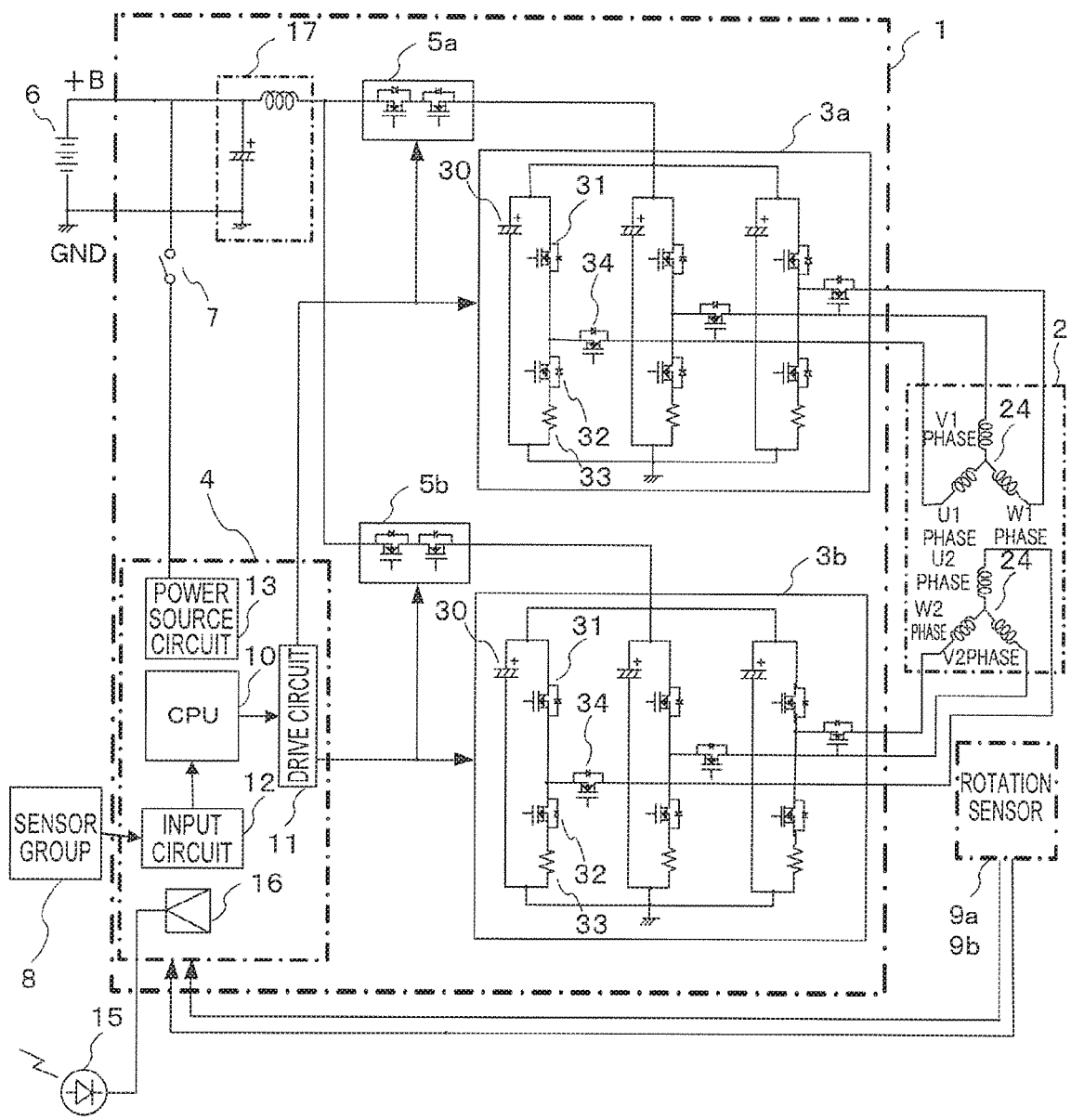
FIG. 1 is a circuit diagram of an electric drive device according to a first embodiment of the present invention.

Below, preferred embodiments of an electric drive device and control method for same according to this invention are described with reference to the drawings. Parts which are the same or equivalent in the drawings are labelled with the same reference numerals.

First Embodiment

FIG. 1 is a circuit diagram of an electric drive device according to a first embodiment of the present invention. The electric drive device according to the first embodiment is used in order to assist the steering torque of electrical power steering, for example.

The electric drive device according to the first embodiment is configured by a control unit 1 and a motor 2. Furthermore, the control unit 1 is constituted by inverter circuits 3a, 3b, a control circuit 4 which is fitted with a CPU 10, inverter disconnection switches 5a, 5b, an ignition switch 7, and a noise suppression filter 17.

The control circuit 4 receives a supply of a power voltage+B from a battery 6 mounted in a vehicle, and a ground voltage GND, via a power source circuit 13 in the control circuit 4, by switching on the ignition switch 7.

Furthermore, the control circuit 4 receives vehicle information including information such as the steering torque and vehicle speed, etc., via an input circuit 12 in the control circuit 4, from a sensor group 8 formed by a torque sensor which is mounted near the steering wheel and which detects the steering torque, and a vehicle sensor which detects the speed of travel of the vehicle.

The CPU 10 calculates a voltage command value for driving the motor 2, on the basis of the vehicle information from the sensor group 8, and outputs the voltage command value to a drive circuit 11. The drive circuit 11 outputs a drive signal for driving the switching elements of the inverter circuits 3a, 3b, in accordance with the voltage command value.

The inverter circuits 3a, 3b are each constituted by upper and lower arm switching elements 31, 32 for supplying current respectively to motor coils 24 (U1, V1, W1), a coil disconnection switch 34 for disconnecting the supply of current to the motor coils 24, a shunt resistance 33 for detecting the current value flowing in the motor coils 24, and a noise suppression capacitor 30.

The inverter circuits 3a, 3b have the same circuit configuration with respect to the motor coils 24 of each phase and each group, so as to be able to supply current independently to each motor coil 24. FIG. 1 illustrates an example in which a shunt resistance 33 for current detection is provided in a lower arm element, but the shunt resistance 33 may be provided in an upper arm element or in the bus line current.

The motor 2 is a brushless motor in which the motor coils 24 of three phases are connected in a star configuration. The motor coils 24 of two groups and three phases are mounted in the motor 2 in order to ensure redundancy. The motor 2 is not limited to two groups and three phases, and similar beneficial effects can be obtained even with a multi-phase rotary machine having coils in m groups and n phases, where m is a natural number equal to or greater than 1 and n is a natural number equal to or greater than 2. Furthermore, the motor 2 may be a brushless motor connected in a three-phase star configuration, or a delta configuration, or may be a motor with brushes.

The control circuit 4 receives, via the input circuit 12, information such as the potential difference between the two ends of the shunt resistance 33 and the voltage difference between the two ends of the motor coils 24, etc. The CPU 10 calculates the difference between the current command value and the measured value of the current flowing to the motor coils 24 which is obtained from this information, and by applying feedback control, supplies a desired current to the motor 2 and assists the steering torque of the electric power steering.

Drive signals are output from the control circuit 4 to the switching elements of the inverter disconnection switches 5*a*, 5*b*. The control circuit 4 is able to respectively and independently disconnect the supply of current to each group of the inverter circuits 3*a*, 3*b*, by switching off the inverter disconnection switches 5*a*, 5*b*. The inverter disconnection switches 5*a*, 5*b* may be incorporated respectively into the inverter circuits 3*a*, 3*b*.

Furthermore, similarly, drive signals are output from the control circuit 4 to the switching elements of the coil disconnection switch 34. The control circuit 4 may respectively and independently disconnect the supply of current to each group and each phase of the motor coils 24, by switching off the coil disconnection switch 34.

Furthermore, the control circuit 4 has an abnormality detection circuit (not illustrated) which detects an abnormality in the motor coils 24 and inverter circuits 3*a*, 3*b*, on the basis of information about the motor coils 24 and inverter circuits 3*a*, 3*b* which is input via the input circuit 12. Consequently, when an abnormality is detected, for example, the CPU 10 is able to, in accordance with the abnormality, switch off the coil disconnection switch 34 in order to disconnect the supply of current to a phase that is not capable of continuous operation, or switch off the inverter disconnection switches 5*a*, 5*b* in order to disconnect, at source, the supply of current to the group that is not capable of continuous operation.

The CPU 10 outputs control information via an output circuit 16 to notification means 15, when an abnormality in the motor 2 is detected. For example, the driver, etc., is notified of an abnormality in the motor 2 by a flashing light, etc.

Rotation sensors 9*a*, 9*b* for detecting the rotation position of the rotor are mounted in the motor 2. The rotation sensors 9*a*, 9*b* are each fitted with two groups of sensors in order to ensure redundancy. The rotation information detected by the rotation sensors 9*a*, 9*b* is transmitted to the input circuit 12 of the control circuit 4.

As described above, the control unit 1 according to the first embodiment has a configuration wherein the motor 2 can be driven independently, by independently processing the input information, calculation values and detection values in each group and each phase. FIG. 1 illustrates a configuration having only one CPU 10, but it is also possible to adopt a configuration having a CPU 10 and a drive circuit 11 respectively in each group. In this case, the drive circuit 11 can be included in the inverter circuits 3*a*, 3*b*.

Figure 2:
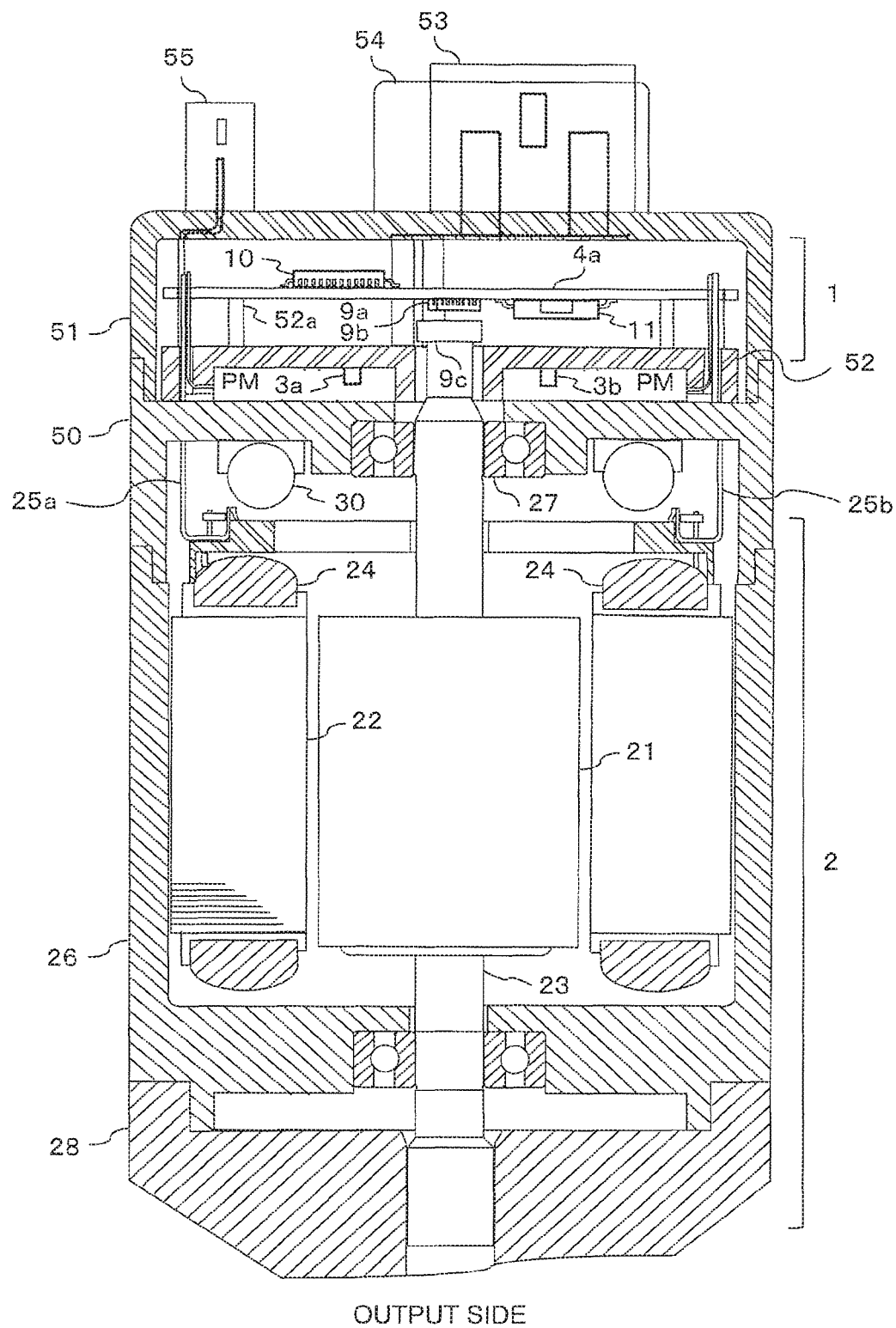
FIG. 2 is a cross-sectional drawing illustrating the overall configuration of the electric drive device according to the first embodiment of the present invention.

FIG. 2 is a cross-sectional drawing illustrating the overall configuration of the electric drive device according to the first embodiment of the present invention. As illustrated in FIG. 2, the electric drive device according to the first embodiment has an integrated structure in which the control unit 1 is installed on the upper side of the motor 2 (the side opposite to the output side).

The motor 2 has a rotor 21 in which permanent magnets (not illustrated) are installed about the periphery of a motor output shaft 23. Furthermore, a stator 22 in which motor coils 24 are wound is installed inside a motor yoke 26, about the periphery of the rotor 21. The rotational torque produced by the motor 2 is transmitted to a speed reducer 28 via a motor output shaft 23.

On the upper side of the motor 2, a total of six extension coils 25*a*, 25*b*, three each respectively from the left and right-hand motor coils 24, are extended upwards through an upper frame 50 (only two extension coils are illustrated in FIG. 2).

The portion above the upper frame 50 is the control unit 1, and the control substrate 4*a* of the control unit 1 is disposed on the line of extension of the motor output shaft 23, to the upper side of the motor 2. The upper frame 50 is fixed to the motor yoke 26 of the motor 2 by press-fitting, for example.

The control unit 1 is installed inside a housing 51 which is made from an insulating resin, for example. Furthermore, inside the housing 51, apart from the control substrate 4*a*, a PM (power module) in which the inverter circuits 3*a*, 3*b* are incorporated is arranged in tight contact with the upper frame 50. Moreover, portions of the leg parts of the PM are extended upwards in the drawing and are connected to the extension coils 25*a*, 25*b*. Furthermore, a portion of the group of leg parts of the control substrate 4*a* also projects upwards.

An intermediate member 52 and the control substrate 4*a* are stacked on the upper side of the inverter circuits 3*a*, 3*b*. A plurality of electronic components including the control circuit 4, the CPU 10 and the drive circuit 11 illustrated in FIG. 1 are mounted on the control substrate 4*a*, but FIG. 2 only illustrates the CPU 10 and the drive circuit 11. The CPU 10 is mounted on the upper surface of the control substrate 4*a*. The drive circuit 11 is mounted on the lower surface of the control substrate 4*a*. Furthermore, the inverter circuits 3*a*, 3*b* are arranged mutually in parallel facing the control substrate 4*a*.

The PM in which the inverter circuits 3*a*, 3*b* are incorporated is fitted tightly to the upper frame 50. The upper frame 50 is made from aluminum, for example, which has good heat conductivity, and serves to support a bearing 27, as well as serving as a heat sink. The PM itself may have a structure that incorporates a heat sink, but there are many cases where heat radiating properties are not sufficient with a built-in heat sink only, and therefore the heat radiating properties may be improved by using an upper frame 50 having a broad surface area and capacity.

Furthermore, the motor yoke 26 lies in close contact with the motor coils 24 and the upper frame 50. Consequently, the motor coils 24 and inverter circuits 3*a*, 3*b* are thermally coupled to each other via the upper frame 50 and the motor yoke 26, and this thermally coupled body improves the heat radiating properties by radiating heat using, as heat sinks, the upper frame 50 and the motor yoke 26, of which the outer circumferential portions are exposed to the outside of the motor 2 as illustrated in FIG. 2.

In FIG. 2, the upper frame 50 is disposed as a single heat sink, but there is no particular requirement for structural coupling, provided that the elements are thermally coupled.

For example, it is also possible to arrange a first upper frame which is in close contact with a first PM incorporating the inverter circuit 3a, and a second upper frame which is in close contact with a second PM incorporating the inverter circuit 3b, as separate structures, and to couple these frames thermally by placing same in close contact with the motor yoke 26.

The intermediate member 52 presses the PM against the upper frame 50 from the upper side, in order to cause the PM which incorporates the inverter circuits 3a, 3b to make close contact with the upper frame 50. Furthermore, the intermediate member 52 has positioning holes for the multiple leg parts of the PM and the extension coils 25a, 25b of the motor 2. Moreover, the intermediate member 52 has column parts 52a for fixing the control substrate 4a at a prescribed interval apart for same.

Furthermore, a power source (+B, GND) line is disposed in the intermediate member 52, and is connected to the inverter circuits 3a, 3b. The connection lines from the inverter circuits 3a, 3b and the extension coils 25a, 25b are extended to the upper surface of the control substrate 4a, and are welded and connected electrically to the control substrate 4a.

Furthermore, a magnet rotor 9c for creating a magnetic field that is detected by the rotation sensors 9a, 9b is installed on the upper side of the motor output shaft 23 (on the side opposite to the output side), and circuits for the rotation sensors 9a, 9b are installed facing the magnet rotor, in line with the lower surface of the control substrate 4a. Therefore, a hole for passing the motor output shaft 23 is formed in the center of the intermediate member 52 and the upper frame 50.

Moreover, a capacitor 30 for suppressing noise is installed in the space between the lower surface of the upper frame 50 and the motor coils 24. The wires of the capacitor 30 are connected to the power source terminals of the inverter circuits 3a, 3b via the intermediate member 52. In this way, the majority of the control unit 1 is disposed to the upper side of the upper frame 50, but a portion thereof is disposed on the side of the motor 2, below the upper frame 50, thus making efficient use of the space.

A plurality of connectors 53, 55 and a cover 54 with a built-in filter 17 (illustrated in FIG. 1) are arranged on the upper surface of the housing 51. The connectors 53, 55 include a power source connector 53 for connecting to the power source 6 (+B, GND) which is illustrated in FIG. 1, and a signal connector 55 of the sensor group 8 and the ignition switch 7 illustrated in FIG. 1.

Extension pins and a bus bar are directed inside the housing 51 from the connectors 53, 55, and are extended inside the control unit 1 and connected to the control substrate 4a and the inverter circuits 3a, 3b. The extension pins and bus bar are extended through the periphery of the housing 51 and reach to the periphery of the control substrate 4a.

Since a plurality of electronic components are mounted on the control substrate 4a, the extension pins and bus bar for connection are arranged, as far as possible, in the peripheral portion of the substrate and are devised so as to be extracted to the center of the substrate by a wiring pattern, thus making efficient use of the surface area of the control substrate 4a.

Figure 3A:
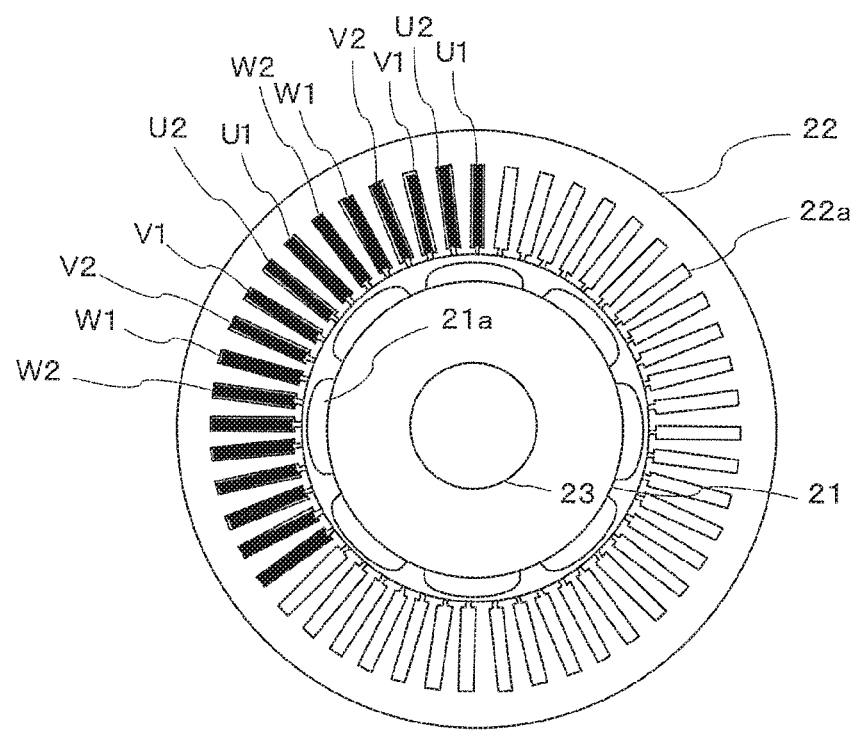
FIGS. 3A and 3B are cross-sectional drawings illustrating the configuration of a motor in the electric drive device according to the first embodiment of the present invention.
Figure 3B:
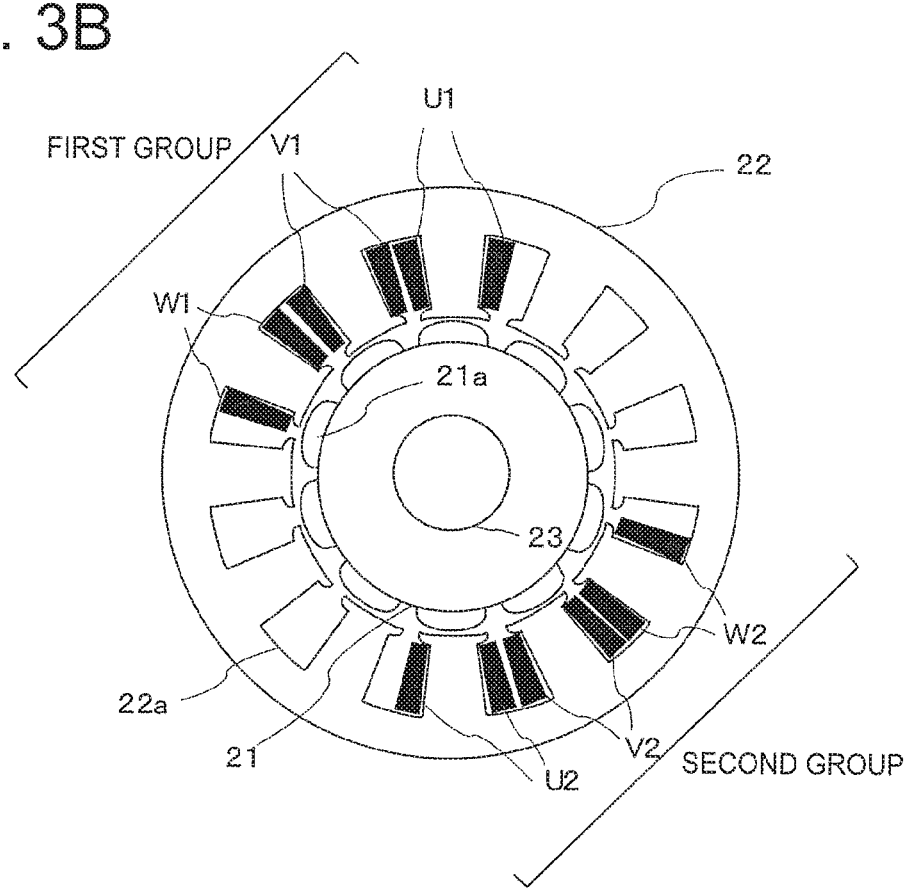

FIGS. 3A and 3B are cross-sectional drawings illustrating the configuration of the motor 2 in the electric drive device according to the first embodiment of the present invention. FIG. 3 illustrates the motor 2 as viewed from the output side of the motor output shaft 23. In the description given below, it is assumed that the motor coils are in two groups and three phases, but as stated above, the motor coils may be in m groups and n phases, where m is a natural number equal to or greater than 1 and n is a natural number equal to or greater than 2.

FIG. 3A illustrates a configuration of the motor 2 when the motor coils are wound in a distributed winding configuration. The stator 22 is configured by stacking thin steel plates, and 48 slots 22a are arranged in a circumferential fashion therein. The rotor 21 is disposed inside the stator 22, and eight permanent magnets 21a are arranged at prescribed positions about the periphery of the rotor 21, in N pole, S pole sequence. The motor output shaft 23 extends on the axis of rotation of the rotor 21, and a gear is provided on the end of the motor output shaft 23 so as to assist the turning of the steering wheel.

The motor coils are wound in the slots 22a, and four coils, for example, are arranged therein. A portion of the state of winding is illustrated in the left half of FIG. 3A.

In FIG. 3A, pairs comprising a first group and a second group having the same phase, U, V, W, are arranged alongside each other, and these pairs having the same phase are inserted and wound in a regular fashion, in the order U, V, W. In this way, in FIG. 3A, the motor coils are wound in a distributed winding configuration. The ends thereof are connected respectively in a star configuration. Furthermore, the extension coils which extend from the motor coils are connected to the coil disconnection switches 34 of the inverter circuits 3a, 3b illustrated in FIG. 1. Moreover, there are three ends of the motor coils in each group, and each end is connected respectively and independently to the inverter circuits 3a, 3b.

In FIG. 3A, there are two groups of motor coils for one rotor, but it is also possible to achieve a tandem-type motor in which the stator itself is configured as two groups in series. In a tandem-type configuration, the length of the motor is approximately two times the size of a one-group motor, which is very inconvenient when the motor is mounted in a vehicle.

On the other hand, FIG. 3B illustrates a configuration of the motor 2 when the motor coils are wound in a concentrated winding configuration. Twelve slots 22a are arranged in circumferential fashion in the stator 22. The rotor 21 is disposed inside the stator 22, and ten permanent magnets 21a are arranged at prescribed positions about the periphery of the rotor 21, in N pole, S pole sequence. The motor output shaft 23 extends on the axis of rotation of the rotor 21, and a gear is provided on the end of the motor output shaft 23 so as to assist the turning of the steering wheel.

In FIG. 3B, a first group arranged in the slots 22a in the order U, V, W and a second group arranged in the order U, V, W are gathered for each group and arranged at separate positions, and are wound in a concentrated winding configuration.

The coil structures of two types illustrated in FIGS. 3A and 3B are typical structures of a motor coil. The control unit needs to be designed in a manner that takes account of the respective winding specifications.

Figure 4:
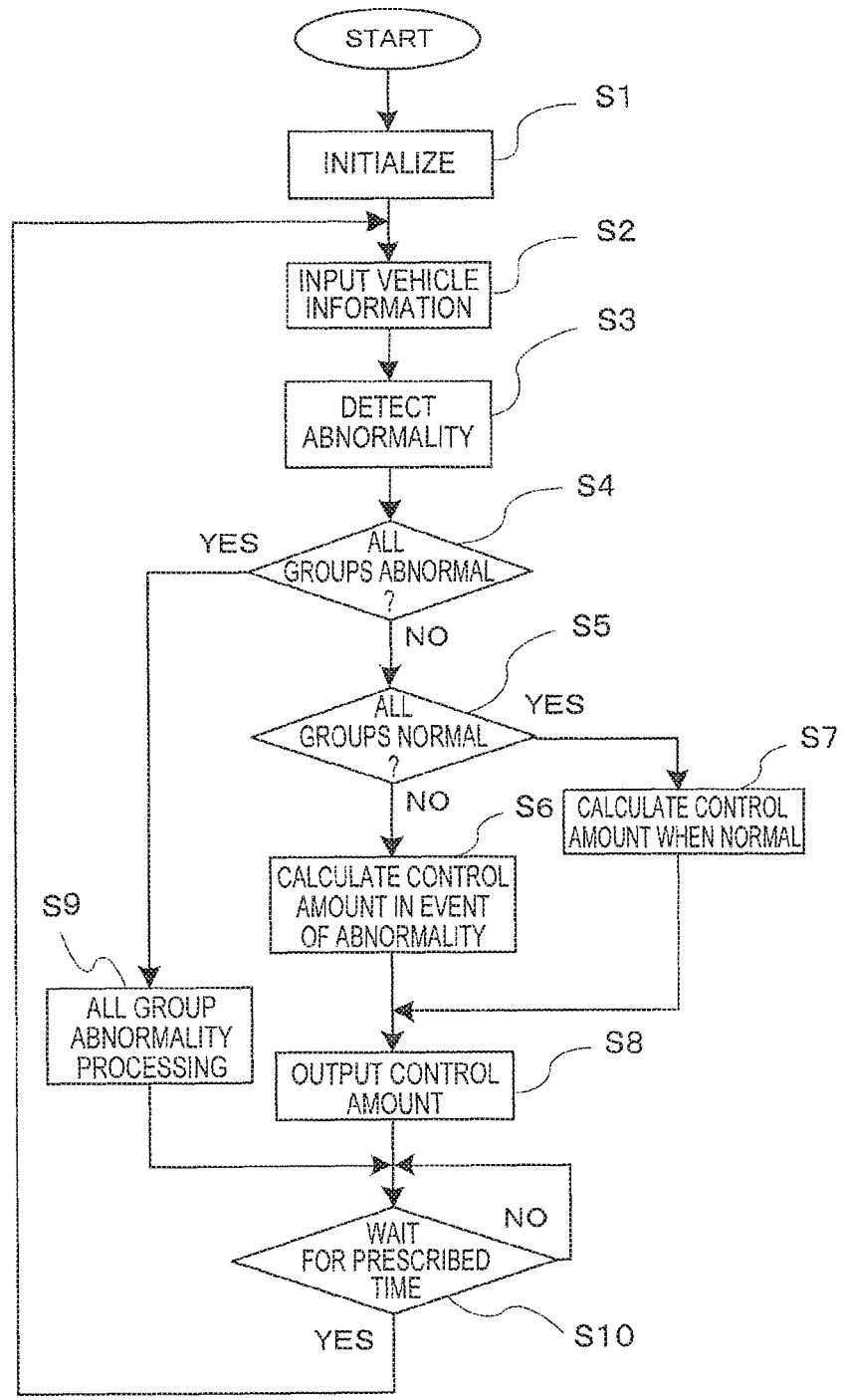
FIG. 4 is a flowchart illustrating a control method for the electric drive device according to the first embodiment of the present invention.

FIG. 4 is a flowchart illustrating a control method for the electric drive device according to the first embodiment of the present invention. The flowchart illustrated in FIG. 4 is stored as software in a memory section (not illustrated) of the control circuit 4, and is executed as a program by the CPU 10 of the control circuit 4. The processing carried out by the CPU 10 of the control circuit 4 is described below with reference to FIG. 4.

When the ignition switch 7 illustrated in FIG. 1 is turned on, a power source is supplied to the control circuit 4, and the CPU 10 starts processing. In step S1, the CPU 10 initializes the RAM, ROM, port, etc. In step S2, vehicle information including information about the steering torque and vehicle speed, etc. is acquired via the input circuit 12 from the sensor group 8.

In step S3, the CPU 10 checks the presence or absence of an abnormality in each group or each phase of the motor coils 24 and inverter circuits 3a, 3b, and saves the detection result thereof. The drive circuit 11 and rotation sensors 9a, 9b of the control circuit 4 may also be included in the objects for abnormality detection.

As a specific method for abnormality detection, for example, it is possible to detect abnormalities by monitoring the current flowing in the switching elements of the inverter circuits 3a, 3b, by the shunt resistance 33. Alternatively, it is also possible to detect abnormalities in the voltage between the two terminals of the motor coils 24, by also monitoring whether or not a particular voltage value or waveform appears in accordance with the driving of the switching elements. Furthermore, it is also possible to determine that there is a possibility of an abnormality, such as an electrical leak, if the detected current value or voltage value is not close to a target value, after a prescribed time period has elapsed.

In step S4, the CPU 10 checks whether or not an abnormality has occurred in all two groups, of the two-group three-phase configuration illustrated in FIG. 1, for example. If an abnormality has occurred in all groups (YES), then the procedure advances to step S9. On the other hand, if at least one of the two groups is normal (NO), then the procedure advances to step S5.

In step S4, if an abnormality has occurred in all of the groups, then in step S9, in a worst case scenario, the output to the drive circuit 11 illustrated in FIG. 1 is stopped, the assistance of the steering torque by the electric power steering is stopped and the steering returns to manual. For example, in the case of a ground fault or a power supply fault in the motor coils 24 or the switching elements of the inverter circuits 3a, 3b, the CPU 10 switches off all of the switching elements including the inverter disconnection switches 5a, 5b.

On the other hand, depending on the circumstances of the abnormality, it may be possible to continue operation. For example, provided that one of the upper and lower arm switching elements 31, 32 of the inverter circuits 3a, 3b, or one of the switching elements of the coil disconnection switches 34 is suffering an open fault, it is possible to continue assistance of the steering torque by the electric power steering, in the phase which has not suffered a fault and is capable of continuous operation.

Figure 5:
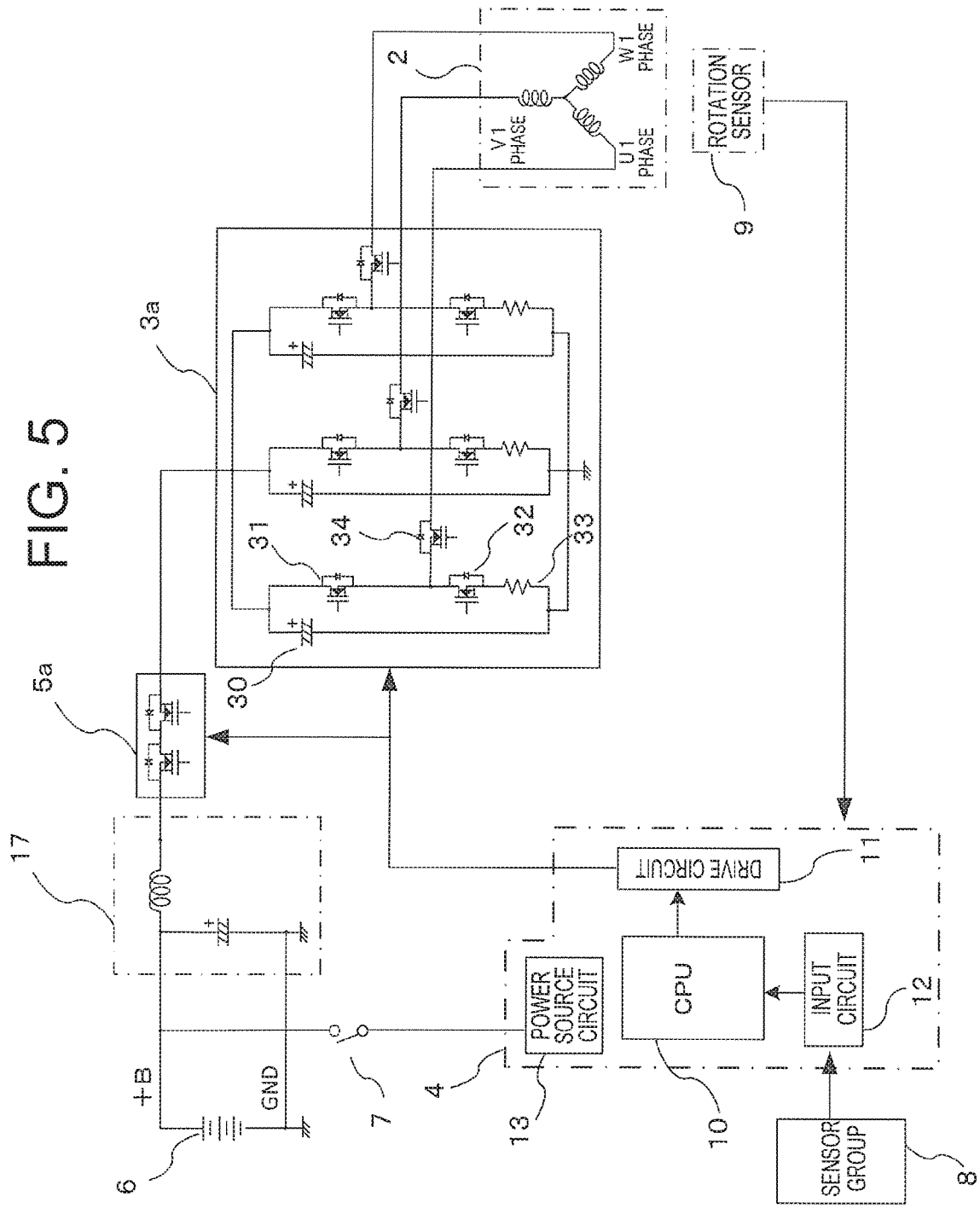
FIG. 5 is a second circuit diagram of the electric drive device according to the first embodiment of the present invention.

In particular, in the case of a configuration having only one group such as that illustrated in FIG. 5, even if there is an abnormality in that single group, by stopping only the phase which is not capable of continuous operation and continuing the driving of the other phase which is capable of continuous operation, it is possible to maintain the assist function of the steering torque by the electric power steering, without interruption.

In this way, step S9 is provided with a continuous operation function for cases where partial driving is possible, apart from a full-scale stop function in the case of an abnormality in all groups, but a partial drive process of this kind also requires a process for calculating a control amount for the current flowing in each group and each phase of the motor coils 24, and hence there are cases where it is more efficient to carry out the processing in step S6 described below.

When only one phase of the three-phase current is stopped, the current ceases to be supplied during a period corresponding to ⅓ of the period of the stopped phase, and therefore the torque variation in the motor 2 during one cycle of the electrical angle increases. Therefore, in a configuration having two or more groups, if there is at least one normal group, as described below, then the partial drive process is not carried out and driving of all of the phases of the group suffering a fault may be stopped.

On the other hand, in step S4, if at least one group is normal, then the CPU 10, in step S5, checks whether or not all of the two groups are normal. If all of the groups are normal (YES), then the procedure advances to step S7. On the other hand, if an abnormality has occurred in at least one group (NO), then the procedure advances to step S6.

In step S5, when all of the groups are normal, the CPU 10, in step S7, calculates the overall current value required in order for the motor 2 to drive the electric power steering, in accordance with the vehicle speed and the torque of the motor 2, and also assigns this current value equally to each group (50% each in the case of two groups), and sets this amount as the control amount for the current to be supplied to each group of the motor coils 24. Instead of assigning the current value equally to each group, it is also possible to, for example, assign the current in accordance with the temperature of the components which constitute each group, so as to assign a larger current to a group that has a lower temperature.

Next, the CPU 10 detects the current values of the motor coils 24 at the present time, from the potential difference of the shunt resistance 33, and calculates the control command value in accordance with the difference between the control amount (target value) current and the detection value. Thereafter, the CPU 10 advances to step S8.

On the other hand, in step S5, if an abnormality has occurred in at least one of the groups, the CPU 10, in step S6, stops the supply of current to the motor coil 24 which is not capable of continuous operation, and also increases the current that is supplied to the motor coil 24 that is capable of continuous operation.

Firstly, a case is described in which continuous operation is not possible in all of the phases of a group where an abnormality has occurred. In the general design of an electric drive device, the current limit value which can be supplied to each group and each phase of the motor coils 24 is determined on the basis of the specifications of the motor coils 24, the rating of the switching elements used in the inverter circuits 3a, 3b, the heat radiating properties of the upper frame 50 and the motor yoke 26 which function as a heat sink, and the resistance heat generated by the other components, etc.

In actual practice, the limit value of the current that can be supplied to the motor coils 24 of this kind is determined by the most severe of the conditions described above. Of these, the particularly important conditions are the heat generating properties and the heat radiating properties of the thermally coupled body which are configured by the motor coils 24 and the inverter circuits 3a, 3b that are coupled to each other thermally.

For example, even if there is a spare margin in the specifications relating to the current that can be supplied to the motor coils 24, in cases where the heat sink constituted by the motor yoke 26 which is thermally coupled to the motor coils 24 has insufficient heat radiating properties, the heat will accumulate gradually in the thermally coupled body, and hence there is a possibility of burning out of the motor coils 24. Consequently, the limit value of the current that can be supplied to the motor coils 24 is determined by the heat generating properties and the heat radiating properties of the thermally coupled body which is constituted by the motor coils 24 and the inverter circuits 3a, 3b, which are thermally coupled to each other.

Here, stopping the supply of current to the abnormal group, in the event of an abnormality, improves the heat generating properties of the thermally coupled body, and therefore generates a spare margin in the limit value of the current that is supplied to the motor coils 24. Consequently, if there is a spare margin in the specifications of the motor coils 24 or the rating of the switching elements used in the inverter circuits 3a, 3b, etc. and there is a bottleneck in the heat generating properties and heat radiating properties of the thermally coupled body, then it is possible to raise the value of the current supplied to the motor coils 24, by the amount of the spare margin generated by the stopping of the supply of current.

Therefore, in the first embodiment, when an abnormality is detected in the motor 2, the supply of current to the group where the abnormality has occurred is stopped, and furthermore, in view of the improvement in the heat generating properties of the thermally coupled body produced by this stopping of the current, the limit value of the current that can be supplied to the group where an abnormality has not occurred is reset to a current limit value in the event of abnormality.

For example, in a normal operation, if the total current for driving the motor 2 is shared by each of the two groups, 50% each, then the CPU 10, upon detecting an abnormality, sets the current supplied to the group where the abnormality has occurred, to 0% of the total current, and furthermore, sets the limit value of the current supplied to the group where an abnormality has not occurred, for example, to 60% of the total current by raising the current by the spare margin of 10% which arises in the heat radiating properties of the thermally coupled body, compared to normal operation.

Alternatively, if continuous operation is possible in a portion of the phases of a group where an abnormality has occurred, then the CPU 10 stops the supply of current to the phase that is not capable of continuous operation, in the group where an abnormality has occurred, and also resets the limit value of the current supplied to the phase capable of continuous operation, in the group where the abnormality has occurred, as the current limit value in the event of abnormality.

For example, in the case of a configuration having only one group as illustrated in FIG. 5, during normal operation, currents displaced in phase by 120 degrees each flow in the three-phase coil. Under conditions of uniform speed and the same torque output, it is considered that the ratio of heat generated by each of the three-phase coils will be substantially equal.

When the CPU 10 has detected an abnormality and stops the supply of current to the phase where the abnormality has occurred, the generated heat decreases in ⅓ of the region of one revolution. The limit on the supplied current is raised by an amount corresponding to the spare margin produced in the heat generating properties of the thermally coupled body, and is set respectively to 3/2 of 50%, or 75%, of the total current. Here, the amount of increase is determined simply by the amount of current, but needless to say, in actual practice, it is determined by taking account of the effects of other factors which are used to determine the limit value of the current that can be supplied to the motor coil 24.

Moreover, under circumstances where uniform torque is output in a fixed state at a particular angle, the current flow is concentrated in one of the phases of the three-phase coils, and the ratio of heat generated by each of the three-phase coils is uneven, and therefore needless to say, it is necessary to increase the current limit value in the event of abnormality by taking account of the required current value, in accordance with the rotational speed of the motor 2, or the vehicle speed and torque.

Furthermore, in the case of a configuration having two groups, such as that illustrated in FIG. 1, a current flows in coils of six phases during normal operation. Under conditions of uniform speed and the same torque output, it is considered that the ratio of heat generated by each of the three-phase coils will be substantially equal. When the CPU 10 has detected an abnormality and stops the supply of current to the phase where the abnormality has occurred, the generated heat decreases in ⅓ of the region of one revolution.

The limit on the supplied current is raised by an amount corresponding to the spare margin produced in the heat generating properties of the thermally coupled body, and is set respectively to 6/5 of 50%, or 60%, of the total current. Here, the amount of increase is determined simply by the amount of current, but needless to say, in actual practice, it is determined by taking account of the effects of other factors which are used to determine the limit value of the current that can be supplied to the motor coil 24.

Moreover, under circumstances where uniform torque is output in a fixed state at a particular angle, the current flow is concentrated in one of the phases of the three-phase coils, and the ratio of heat generated by each of the three-phase coils is uneven, and therefore needless to say, it is necessary to increase the current limit value in the event of abnormality by taking account of the required current value, in accordance with the rotational speed of the motor 2, or the vehicle speed and torque.

In FIG. 1, a two-group three-phase configuration is adopted, and in FIG. 5, a one-group three-phase configuration is adopted, but as stated above, similar beneficial effects can be obtained, provided that the configuration has m groups and n phases, wherein m is a natural number equal to or greater than 1 and n is a natural number equal to or greater than 2.

Furthermore, it is also possible to combine the use of a process for increasing the current to the group that is capable of continuing, and a process for increasing the current to the phase that is capable of continuing. Both processes may be used simultaneously, and if the motor 2 can be driven by one process only, then that one process may also be used alone. In this way, it is possible to suppress the effects of decline and variation in the torque of the motor 2 due to an abnormality, by controlling the current supplied to at least one group or phase of the motor coils 24 that is capable of continuous operation, to be less than the current limit value in the event of abnormality.

In step S8, the CPU 10 calculates the control signal for driving the switching elements of the inverter circuits 3a, 3b, from the control amount calculated in steps S6 and S7. More specifically, the CPU 10 outputs a control signal by setting the PWM duty value for PWM driving of the switching elements 31, 32 of the upper and lower arms.

The PWM cycle is very short indeed compared to the flowchart illustrated in FIG. 4, and therefore the actual output processing is executed by a separate time management program, such as an interrupt process, for example. Thereafter, the CPU 10 advances to step S10.

In step S10, for example, when the flowchart is repeated every 5 ms, the CPU 10 waits until 5 ms has passed after the start of the present cycle. If the prescribed time has passed (YES), then the CPU 10 returns to step S2 and repeats the processing described above.

In this way, when an abnormality in the motor or the inverter circuits is detected, the current supplied to each group and each phase that is capable of continuous operation can be increased in comparison with normal operation, and therefore it is possible to maintain steering assistance.

The current limit value in the event of abnormality which is reset when the abnormality in the motor is detected, may be saved in a memory unit as a table of values which are calculated previously in accordance with the fault patterns of the groups and phases.

As described above, according to the first embodiment, when an abnormality in the motor is detected, the current to the motor coil which is not capable of continuous operation is stopped, and furthermore, in view of the improvement in the heat generating properties of the motor caused by this stopping of the current, the limit value of the current to the motor coil of the phase that is capable of continuous operation is raised. As a result of this, it is possible to achieve an electric drive device, and a control method for same, wherein, even if there is no spare margin in the limit value of the current to the motor coil during normal operation, when an abnormality in the motor is detected, the current to the motor coil where an abnormality has not occurred is increased in comparison with normal operation and it is therefore possible to suppress the effects of decline and variation in the motor torque due to the abnormality.

It is also possible to adopt a redundancy configuration wherein the CPU 10 includes, for example, CPUs 10 of equal number to the number of groups, and each of the CPUs 10 can control each of the groups independently. In this case, it is possible to ensure redundancy in the drive circuit 11, by connecting the plurality of CPUs by a communication line and sharing between the CPUs information, such as the conditions in which the abnormality occurs, and the load ratio, etc. for each of the groups. The plurality of CPUs may be incorporated into the same package.

Furthermore, even with one CPU, it is also possible to achieve a redundancy system by setting up independent software configurations, and storing the control commands, and other result values thereof, separately. In this case, moreover, by assigning the output port for the drive circuit 11 to different ports, it is possible to continue output from another port, if one port is suffering an abnormality. Consequently, only one CPU is required in the control circuit 4, and therefore the size of the circuit can be reduced in comparison with a circuit having CPUs 10 in equal number to the number of groups. Furthermore, by omitting the communication line, it is possible to make the system more resistant to communication errors resulting from noise, and the like.

Furthermore, in the description given above, when an abnormality in the motor coils 24 and the inverter circuits 3a, 3b is detected, the supply of current to the group or phase of the motor coil 24 that is not capable of continuous operation is stopped, but instead of completely stopping the supply of current, it is also possible to reduce the supplied current. The spare margin of the heat radiating properties of the thermal coupling body, which is improved when the supplied current is reduced, is smaller than when the supply of current is stopped completely, but similar beneficial effects can be obtained.

Second Embodiment

A second embodiment gives a detailed description of the method for resetting the limit value of the current to the motor coil that is capable of continuous operation, when an abnormality in the motor coils and inverter circuits is detected. The configuration of the electric drive device in the second embodiment is the same as the first embodiment above.

Figure 6:
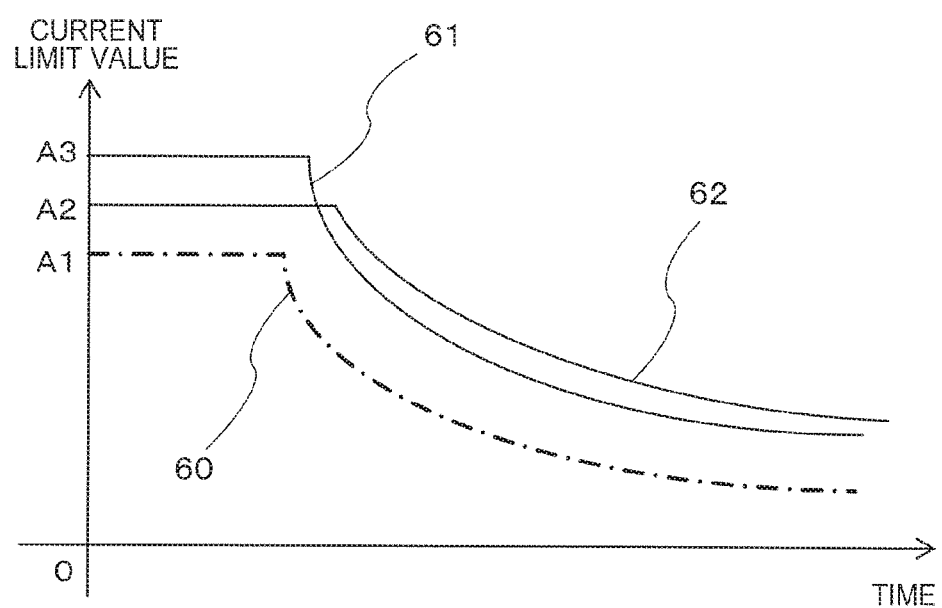
FIG. 6 is a characteristics diagram illustrating the limit value of the current supplied to a motor coil in an electric drive device according to a second embodiment of the present invention, and the change over time therein.

FIG. 6 is a characteristics diagram illustrating the limit value of the current supplied to a motor coil in an electric drive device according to the second embodiment of the present invention, and the change over time therein.

In FIG. 6, a current limit value 60 which is indicated by the single-dotted line indicates the limit value of the current during normal operation, when no abnormality has occurred. In the case of normal operation, it is possible to pass a current for supply to each group and each phase of the motor coils, up to a current limit value when normal A1, which is determined on the basis of the heat generating properties and the heat radiating properties of the thermal coupling body which includes the motor coils and the inverter circuits.

Furthermore, in the current limit value 60 illustrated in FIG. 6, deterioration in the heat generating properties and the heat radiating properties of the thermally coupled body over time, due to continuous operation of the motor, is also taken into account, and the current limit value 60 is set so as to decrease at a predetermined rate of decrease, with the passage of the operating time of the motor.

On the other hand, a current limit value 61 indicates a first example of the current limit value in a case where an abnormality has occurred. In the current limit value 61, the improvement in the heat generating properties of the thermal coupling body due to the stopping of the supply of current to the motor coil which is not capable of continuous operation is taken into account, and the supply of current to the motor coil when an abnormality has occurred can be increased to a current limit value in the event of abnormality A3 which is higher than the current limit value when normal A1.

However, with the current limit value 61, since the limit value of the current is raised, the heat generating properties of the thermally coupled body deteriorate to a greater extent over time, with the continuous operation of the motor. Therefore, the current limit value 61 is set in such a manner that the rate of decrease with respect to the passage of the operating time of the motor becomes greater (more severe).

Furthermore, the current limit value 62 shows a second example of the limit value of the current when an abnormality has occurred, which considers a balance between the limit value of the current and the rate of decrease. With the current limit value 62, the increase in the limit value of the current is kept at a current limit value in the event of abnormality A2 which is between the current limit value A1 and the current limit value in the event of abnormality A3, whereby the rate of decrease in the current limit value 62 with the passage of the operating time of the motor can be set to an intermediate value between that of the current limit value 60 and the current limit value 61.

Moreover, as a third example of a current limit value when an abnormality has occurred, it is also possible to increase the rate of decrease only, while maintaining the current limit value at A1.

In this way, by selecting a combination of the current limit value and the rate of decrease value in accordance with the torque value of the motor in the event of an abnormality, then it is possible to flexibly suppress the effects of decrease and variation in the torque of the motor due to an abnormality. For example, when an abnormality has occurred in a high torque region, the high torque can be maintained by selecting a current limit value 61 which enables the output of high torque. On the other hand, when an abnormality has occurred in a medium torque region, then it is possible to maintain high torque, over a long period of time, by selecting the current limit value 62.

As described above, according to the second embodiment, it is possible to achieve an electric drive device and a control method for same wherein the limit value of the current supplied to the motor coils is set so as to decrease at a predetermined rate of decrease with the passage of the operating time of the motor, and when an abnormality is detected, the current limit value and the rate of decrease thereof are reset within the range of improvement of the heat generating properties of the thermally coupled body, thereby making it possible to suppress the effects of decrease and variation in the torque of the motor due to an abnormality.

The invention claimed is:

1. An electric drive device, comprising:
a multiple-phase rotary machine having a stator in which coils of m groups and n phases are wound, where m is a natural number equal to or greater than 1 and n is a natural number equal to or greater than 2, and a single rotor;
an inverter circuit for each group which supplies current independently to a corresponding one of each group and each phase of the coils in the corresponding group; and
a control circuit including a drive circuit which drives the inverter circuit,
the control circuit controlling a current supplied to the coils during normal operation so as to be less than a current limit value when normal, which is determined from heat generating properties and heat radiating properties of a thermally coupled body that includes the coils and the inverter circuit,
wherein the control circuit further includes an abnormality detection circuit which detects an abnormality in each group or each phase of the coils and the inverter circuit for each group, and when the abnormality detection circuit detects an abnormality, the control circuit:
stops or reduces the supply of current to all phases of a group suffering an abnormality in the coils, or to a phase that is not capable of continuous operation;
resets the limit value of the current supplied to a coil that is capable of continuous operation, to a current limit value in the event of abnormality, which is larger than the current limit value when normal, within the range of improvement of the heat generating properties of the thermally coupled body due to the stopping or reduction of the supply of current; and
controls the current supplied to at least one group or phase of the coil that is capable of continuous operation so as to be less than the current limit value in the event of abnormality.

2. The electric drive device according to claim 1,
wherein the current limit value when normal and the current limit value in the event of abnormality are set so as to decrease at a predetermined rate of decrease with the passage of operating time of the multiple-phase rotary machine, and
when the abnormality detection circuit detects an abnormality, the control circuit resets the current limit value in the event of abnormality and the rate of decrease thereof, within the range of improvement of the heat generating properties of the thermally coupled body.

3. The electric drive device according to claim 1, further comprising a heat sink,
wherein the coils and the inverter circuit of the thermally coupled body are thermally coupled via the heat sink.

4. The electric drive device according to claim 1,
further comprising a coil disconnection switch which disconnects the supply of current to each group and each phase of the coils,
wherein, when the abnormality detection circuit detects an abnormality, the control circuit stops the supply of current to a phase of the coils that is not capable of continuous operation, by switching off the coil disconnection switch.

5. The electric drive device according to claim 1,
further comprising an inverter disconnection switch which disconnects the supply of current to each group of the inverter circuit,
wherein, when the abnormality detection circuit detects an abnormality, the control circuit stops the supply of current to the group suffering the abnormality in the coils, by switching off the inverter disconnection switch.

6. The electric drive device according to claim 1, wherein the coils are wound in a distributed winding configuration.

7. The electric drive device according to claim 1, wherein the coils are gathered and arranged for each group, and are wound in a concentrated winding configuration.

8. The electric drive device according to claim 1, which is used to assist a steering torque of electric power steering.

9. A control method for an electric drive device that includes:
a multiple-phase rotary machine having a stator in which coils of m groups and n phases are wound, where m is a natural number equal to or greater than 1 and n is a natural number equal to or greater than 2, and a single rotor; and
an inverter circuit which supplies current independently to each group and each phase of the coils,
the method comprising:
an abnormality detection step of detecting an abnormality in each group or each phase of the coils and the inverter circuit;
a step of, when an abnormality is not detected in the abnormality detection step, controlling a current supplied to the coils so as to be less than a current limit value when normal, which is determined from heat generating properties and heat radiating properties of a thermally coupled body that includes the coils and the inverter circuit;
when an abnormality is detected in the abnormality detection step,
a step of stopping or reducing the supply of current to all phases of a group suffering an abnormality in the coils, or to a phase that is not capable of continuous operation;
a step of resetting the limit value of the current supplied to a coil that is capable of continuous operation, to a current limit value in the event of abnormality, which is larger than the current limit value when normal, within the range of improvement of the heat generating properties of the thermally coupled body due to the stopping or reduction of the supply of current; and
a step of controlling the current supplied to at least one group or phase of the coil that is capable of continuous operation so as to be less than the current limit value in the event of abnormality.

* * * * *